(12) United States Patent
Nixdorf

(10) Patent No.: US 6,913,059 B2
(45) Date of Patent: Jul. 5, 2005

(54) CERAMIC FIBER-BASED FILTER WEB AND METHOD

(75) Inventor: Richard D. Nixdorf, Knoxville, TN (US)

(73) Assignee: Industrial Ceramic Solutions, Oak Ridge, TN (US)

(*) Notice: Subject to any disclaimer, the term of this patent is extended or adjusted under 35 U.S.C. 154(b) by 113 days.

(21) Appl. No.: 10/436,918

(22) Filed: May 13, 2003

(65) Prior Publication Data

US 2003/0209488 A1 Nov. 13, 2003

Related U.S. Application Data

(60) Provisional application No. 60/380,210, filed on May 13, 2002.

(51) Int. Cl.[7] ............................. B01D 46/52; B31F 1/20

(52) U.S. Cl. .................... 156/474; 210/493.1; 210/505; 210/508; 55/497; 55/498; 55/523; 55/524; 55/DIG. 5

(58) Field of Search ........................ 55/497, 498, 502, 55/523, 524, DIG. 5; 210/493.1, 505, 508; 156/474

(56) References Cited

U.S. PATENT DOCUMENTS 6,582,490 B2 * 6/2003 Miller et al. .................... 55/520
2003/0165638 A1 * 9/2003 Louks et al. ................. 427/600

* cited by examiner

Primary Examiner—Robert A. Hopkins
(74) Attorney, Agent, or Firm—Pitts & Brittian, P.C.

(57) ABSTRACT

A filter medium formed from a web of ceramic fibers, pleated and integrated into a coherent unit employing a ceramic sol. A method is disclosed.

15 Claims, 4 Drawing Sheets

CERAMIC FIBER-BASED FILTER WEB AND METHOD

RELATED APPLICATIONS

This application is a non-provisional application based on provisional application Ser. No. 60/380,210, filed May 13, 2002, entitled: Pleated Ceramic Filter Paper and Method.

This invention was made with Government support under Subcontract No. 4000000723 funded by the Government. The Government has Certain rights in the invention.

FIELD OF INVENTION

The present application is directed to a ceramic filter medium formed from ceramic fibers and to filters containing such medium.

BACKGROUND OF INVENTION

Filter media formed from sheets of ceramic fibers, per se, are known in the art, as is the use of such ceramic-based media in filters for extraction of volatazable particulate material from gas streams, such as the exhaust from diesel engines. One such filter media and filter formed therefrom is disclosed in U.S. Pat. No. 5,087,272, including a method of manufacturing the ceramic-based medium itself. This patent is incorporated herein in its entirety by reference. Regeneration of filters which include a ceramic-based filter medium, employing microwave energy, is also disclosed in the prior art.

Known prior art ceramic-based filter media suffer from major problems, including, the inability to economically produce a web of ceramic fibers which is sufficiently pliable as permits the web to be folded, as by pleating employing small radii folds, into a geometry which is suitable for use in a filter unit where closely packed pleats are required due to size limitations imposed by the environment in which the filter is to be employed, the excessive steps, hence cost, required in the prior art to achieve a web of even limited pliability, and the inability to satisfactorily control the initial permeability and ensure the continued stability of the initial permeability of the prior art ceramic-fiber-based webs, leading to the tendency of the pores of the prior art filter media to become clogged by the particulate material which the filter extracts from an ambient environment. For example, current technology employs organic thermosetting binders to hold the shapes of the pleats of the web, and, after pleating of the web, the organic binder detracts from the high temperature performance of the pleated web and interferes with the subsequent addition of higher temperature inorganic binders to the web.

SUMMARY OF INVENTION

In accordance with one aspect of the present invention, there is provided a ceramic-fiber-based web which is particularly suitable for use as a filter medium in a filter unit. Importantly, the filter medium of the present invention may be regenerated employing microwave energy. In a preferred embodiment of the present invention, ceramic fibers are mixed with a minor portion of cellulosic fibers and the mixture is formed into a web wherein individual ones of the fibers are intertangled and intersect neighboring ones of others of the fibers.

Following formation of the ceramic fiber-based web, the web is treated with an inorganic, preferably ceramic, binder assist agent, preferably saturating the web with the binder assist agent.

Following the drying of the binder assist agent on the fibers of the web, neighboring ones of the treated fibers are at least partially bonded to one another at least at their respective intersections, employing an inorganic, preferably ceramic, binder.

In one aspect of the invention, the ceramic binder is a sol of a ceramic material which is applied onto at least substantially all of at least one surface of the web, and preferably saturating the web, employing multiple applications of the sol to the web, with intermediate drying and heat treatments of the binder-bearing web. The use of multiple applications of the sol to the web has been found important in establishing the desired overall porosity of the filter medium in that multiple applications of the sol prevent uncontrolled closing off of the tortous passageways through the thickness of the web, hence loss or substantially complete destruction of the desired porosity of the web. In the course of drying and heat treatments of the sol, following an application of sol to the pretreated fibers of the formed web, the sol bonds to the fibers of the web and shrinks and draws the fibers along their respective lengths between their respective intersections, thereby providing for the development of a desired porosity of the web, such porosity remaining substantially constant throughout the incorporation of the web into a filter unit and throughout the ultimate use of the filter unit in the separation of solid particulates from a gaseous stream which contains such solid particulates, and regeneration of the filter unit employing microwave energy.

More specifically, in a preferred embodiment of the present invention, the ceramic-fiber based web, bearing the binder assist agent, is subjected to a first application of sol to the web, followed by drying of the web. This operation imparts integrity to the web and a limited decrease in the drape of the web. At this juncture in the formation of the present filter medium, the web is wetted with a water mist, the amount of waterbeing applied to the web being sufficient to soften the inorganic binder on the fibers and render the web temporarily pliable. Preferably, in this spraying of the web, between about 13 and about 23 ml of water at room temperature is applied to each square foot of the surface area of one side of the sandwich. The spray is applied to web in equal volumes per square foot of surface area. The web, thus treated with the mist, is fed into and through a conventional, pleating machine and the pleated web is dried while the shape of the pleats is maintained. Maintaining the shape of the pleats can take any suitable form, but may be as simple as tying a string about the girth of a bundle of the pleated web. Once dried, the pleated web retains its shape sufficiently for further processing thereof.

Following the pleating of the web, the pleated web is subjected to one or more further applications of the sol to the fibers of the web and drying of the web. Each of such further applications of the sol, and drying of the web, is followed by a heat treatment of the web. This heat treatment may be in the form of a sintering operation which solidifies the web in its pleated state, renders the web dimensionally stable, and therefore suitable for incorporation into a metal or other structural member as a filtration member of the resulting combination. The present inventor has found that multiple applications of sol, followed by the heat treatment thereof, permits the consistent formation of a porous filter medium of a selected porosity which is substantially consistent over the overall area of the filter medium. As a consequence, the filter medium of the present invention resists clogging of its pores (tortuous passageways through the thickness thereof) by particles extracted from an ambient environment during subsequent use of the filter. Moreover, by means of the present invention, one may select, and develop, that degree of porosity which is most suitable for the filter medium employed in a given filtration operation, and be assured that this selected and developed porosity will remain constant curing both the filtration function performed by the filter, and the regeneration of the filter employing microwave energy of a magnitude sufficient to "burn away" particles captured on the filter medium during a filtration operation.

In accordance with a further aspect of the present invention, the web exhibits unexpectedly pliability, including the ability to be pleated employing fold radii of less than about 1/32 inch. Of course larger radii may be employed as desired. This ability permits the incorporation of a greater area of filtration medium within a given volume of filter unit housing, hence making filter units containing filter medium of the present invention attractive for inclusion in those applications where there are size restrictions.

DETAILED DESCRIPTION OF THE INVENTION

Figure 1:
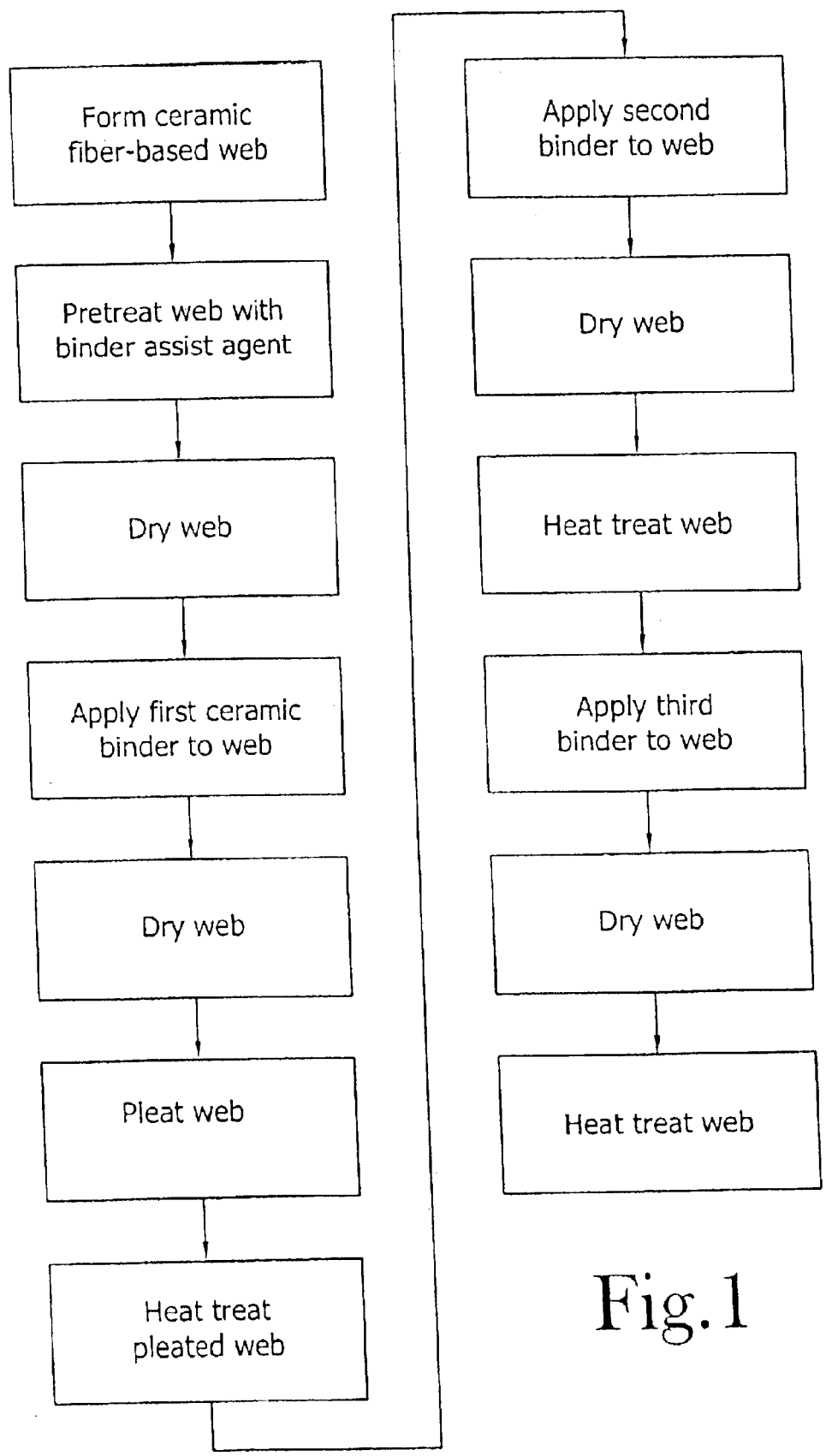
FIG. 1 is a schematic flow diagram of a method for the manufacture of a filter medium embodying various of the features of the present invention.
Figure 2:
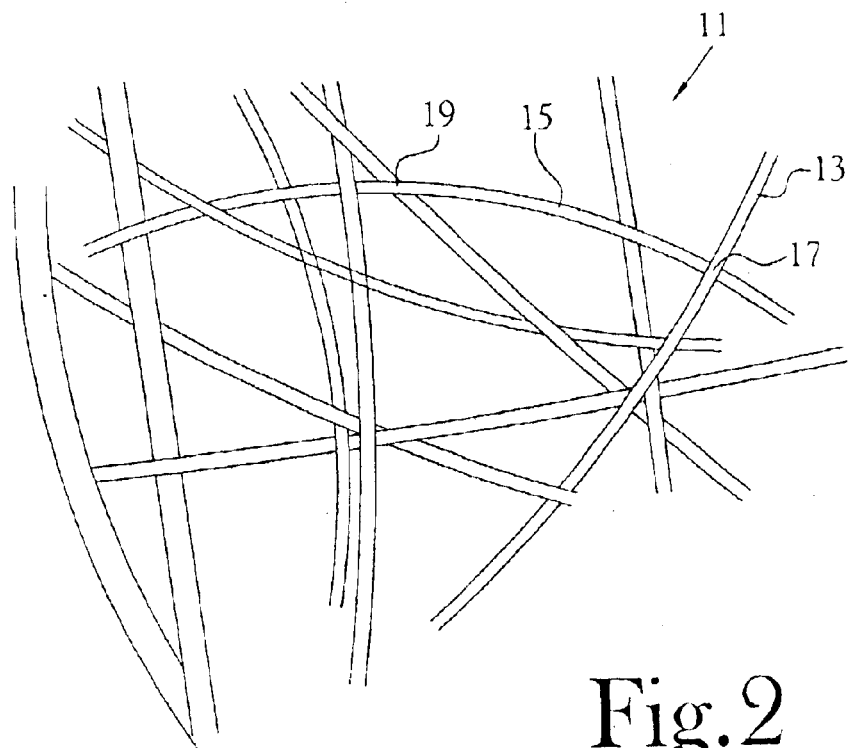
FIG. 2 is a representation of a ceramic fiber-based web prior to the addition thereto of a ceramic binder and embodying various of the features of the present invention.

Referring to FIG. 1, in accordance with one aspect of the present invention, a quantity of ceramic fibers, mixed with a minor quantity of cellulosic fibers, in a liquid carrier, such as water, are wet-laid onto a screen and the liquid carrier drained or withdrawn from the fibers to define a web, in the nature of the well-known Roto-Former or Fourdrinier paper-making process. It will be recognized by one skilled in the art that other processes may be employed for the formation of a web of fibers. In any event, the process chosen results in the deposition of the fibers onto a screen or the like with the fibers being intertangled with and intersecting neighboring ones of the fibers. FIG. 2 depicts the microstructure of a ceramic fiber-based web 11 of the present invention, without a ceramic binder, in which individual ones of the fibers 13 (typical) are intertangled with and/or intersect neighboring ones of the fibers and portions 15 of individual fibers between their intersections 17 and 19 being unsupported. These overlaid and intersecting fibers further define the basis upon which tortous passageways 21 (typical)(see FIG. 3) through the thickness of the web, along with limited numbers of "straight-through" passageways 23 between the opposite surfaces of the web may be obtained.

Figure 3:
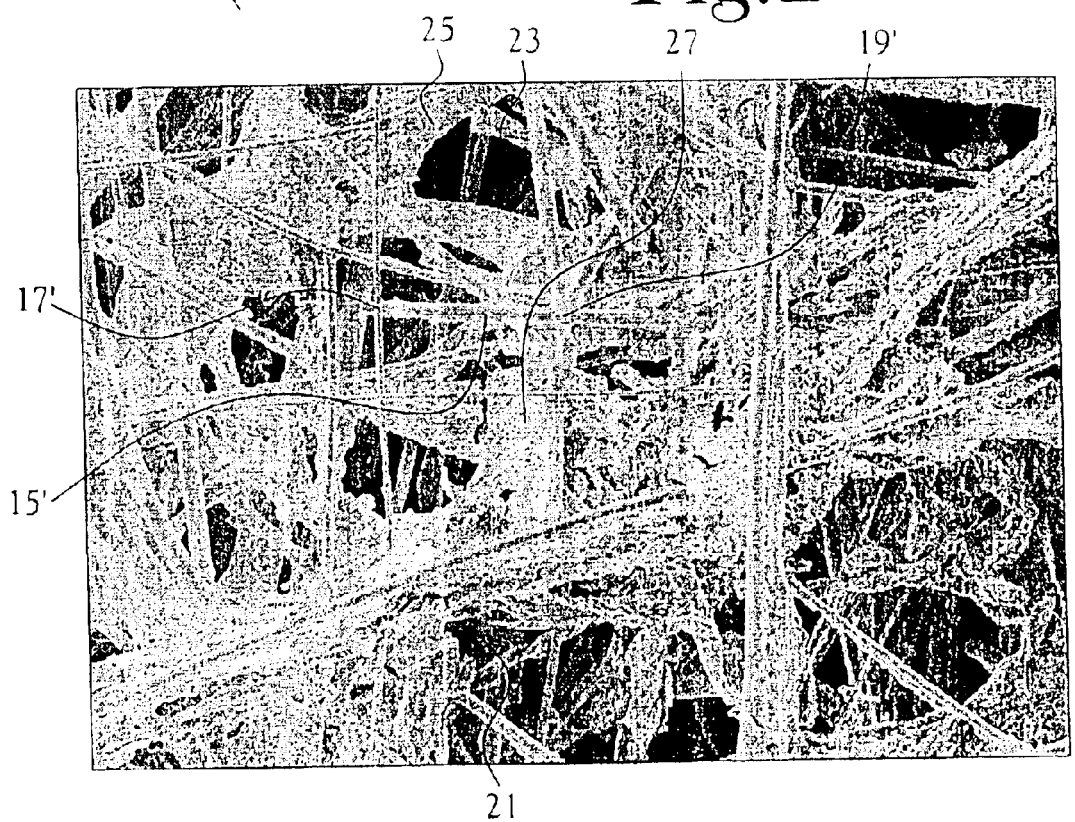
FIG. 3 is a microphotograph of a ceramic fiber-based web including a ceramic binder and embodying various of the features of the present invention.

As depicted schematically in FIG. 3, after its formation, the web 11 formed in accordance with the present invention is pretreated by applying to the web a solution of a binder assist agent, preferably saturating the web with the binder assist agent. Upon drying of the binder assist agent on the fibers of the web, the web exhibits a stiffness such that the web is self-supporting, but it can not be folded or pleated without destruction of the web.

Following drying of the binder assist agent on the fibers of the web, the pretreated web has applied thereto a ceramic binder 25, preferably a sol of an inorganic ceramic material. In accordance with one aspect of the present invention, multiple applications of the sol to the web are performed. In each application, the fibers of the web are saturated with the ceramic binder, followed by drying of the web, leaving the ceramic binder deposited on the fibers of the web. Referring to FIG. 3, the ceramic binder tends to accumulate in the nature of islands 27 of ceramic binder at individual ones of the intersections of neighboring fibers of the web. These islands may extend to varying depths within the interior of the web and are randomly distributed substantially throughout the overall area and thickness of the web to define tortuous passageways 21 for fluid flow between the opposite surfaces of the web, hence through the thickness of the web. Importantly, the ceramic binder also attaches to the unsupported lengths 15' of individual ones of the fibers between their intersections 17', 19' with other fibers. It has been found by the present inventor that upon drying, the ceramic binder shrinks. This action has been discovered to provide multiple advantages. Specifically, as the ceramic binder disposed at the intersections of fibers shrinks, the binder effects bonding of the fibers to one another at their intersections, reduces its area at these intersections to thereby open up tortuous passageways which lead in random directions through the thickness of the web and in some instances develop passageways 23 which lead "straight through" the thickness of the web. Further, selection of the total volume of ceramic binder applied per unit area of a web of a given fiber density, it has been found possible to adjust the overall porosity of the web, hence enable the production of filter media which exhibit varying permeabilities, hence the ability to extract different size particles from a flowing gaseous stream bearing such particles.

More specifically, in a preferred embodiment of the present invention, the ceramic-fiber based web, bearing the binder assist agent, is subjected to a first application of sol to the web, followed by drying of the web. This operation imparts integrity to the web and a limited decrease in the drape of the web. At this juncture in the formation of the present filter medium, the web is wetted with a water mist, the amount of water being applied to the web being sufficient to soften the inorganic binder on the fibers and render the web temporarily pliable. Preferably, in this spraying of the web, between about 13 and about 23 ml of water at room temperature is applied to each square inch of the surface area of one side of the sandwich. The spray is applied to web in equal volumes per square inch of surface area. The web, thus treated with the mist, is fed into and through a conventional pleating machine and the pleated web is dried while the shape of the pleats is maintained. Maintaining the shape of the pleats can take any suitable form, but may be as simple as tying a string about the girth of a bundle of the pleated web. Once dried, the pleated web retains its shape sufficiently for further processing thereof.

Figure 4:
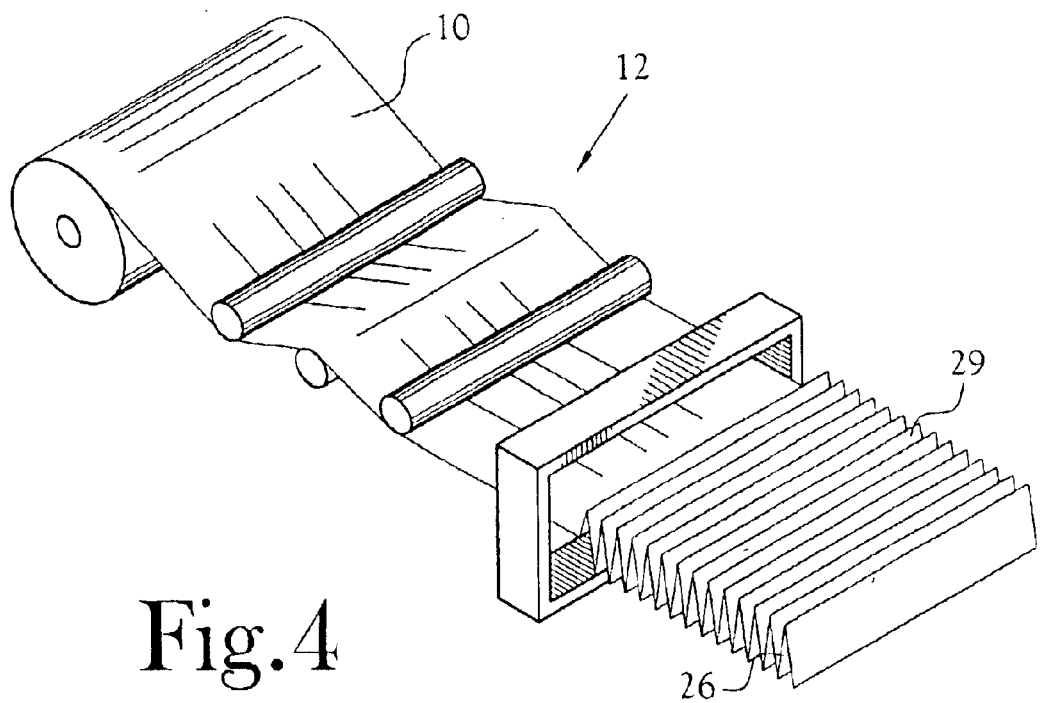
FIG. 4 is a schematic representation of an apparatus and process for pleating a ceramic fiber-based web of the present invention to define a filter medium.

The ceramic fibers of the web can be deleteriously abrasive to a pleating machine, such as a JCEM Pleating Machine. To aid in reduction of such abrasion of the pleating machine, the present inventor sandwiches the web between opposing sheets of a kraft (butcher type) paper prior to feeding the web into the pleating machine as schematically depicted in FIG. 4. Commonly, these sheets of kraft paper are removed from the pleated web prior to further processing of the web. Operation of a commercial pleating machine, such as a JCEM Pleating Machine, is well understood by a person skilled in the art so that a detailed explanation of the structure and functioning of such machine is not deemed necessary.

Following pleating of the one-time-binder-treated web, the web is subjected to a second application of the inorganic ceramic sol binder in like manner as the application of the first quantity of the sol, and then dried. Following drying of this web, it is subjected to a heat treatment wherein the binder is "fired" (sintered) and the cellulosic fibers are driven off the web.

Thereafter, the pleated web is subjected to a third application of the inorganic ceramic sol binder, followed by drying of the web. This three-time binder treated web is again subjected to a heat treatment wherein the binder is "fired" (sintered) and organic matter, if any, remaining on the web is driven off the web, leaving a completed pleated filter medium.

Figure 5:
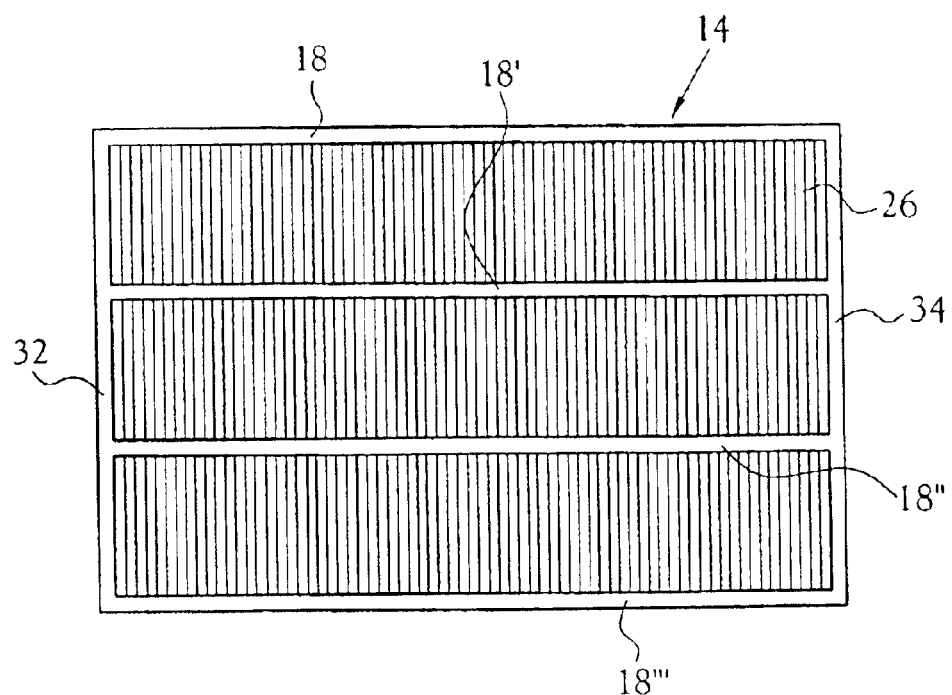
FIG. 5 is a representation of a pleated filter medium of the present invention incorporated into a housing to define a filter unit.
Figure 7:
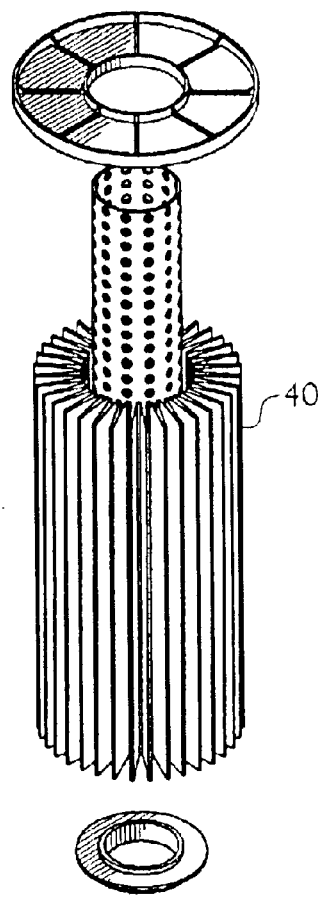

The completed pleated filter medium is sufficiently flexible to permit it to be formed into a conventional cylindrical configuration 40 as depicted in FIG. 7, if desired. Further, the web may be arranged in a planar pleated sheet as depicted in FIGS. 4 and 5. In either event, the web has been found to be exceptionally dimensionally stable in whatever geometry it may be arranged and, therefore, compatible with its incorporation into a metal housing, for example, or other housing material which is suitable for use in the anticipated use environment of the final filter unit.

Importantly, the present inventor has discovered that the shrinking of the ceramic binder which is associated with those unsupported portions of individual fibers between their adjacent intersections with other fibers draws the fibers and establishes a large multitude of flex points within the web. That is, the ceramic binder-bearing unsupported portions of the fibers (both ceramic and cellulosic fibers) impart to the overall web a heretofore unattainable flexibility as evidenced by the sharp bends which are possible when pleating webs of the present invention.

Figure 6:
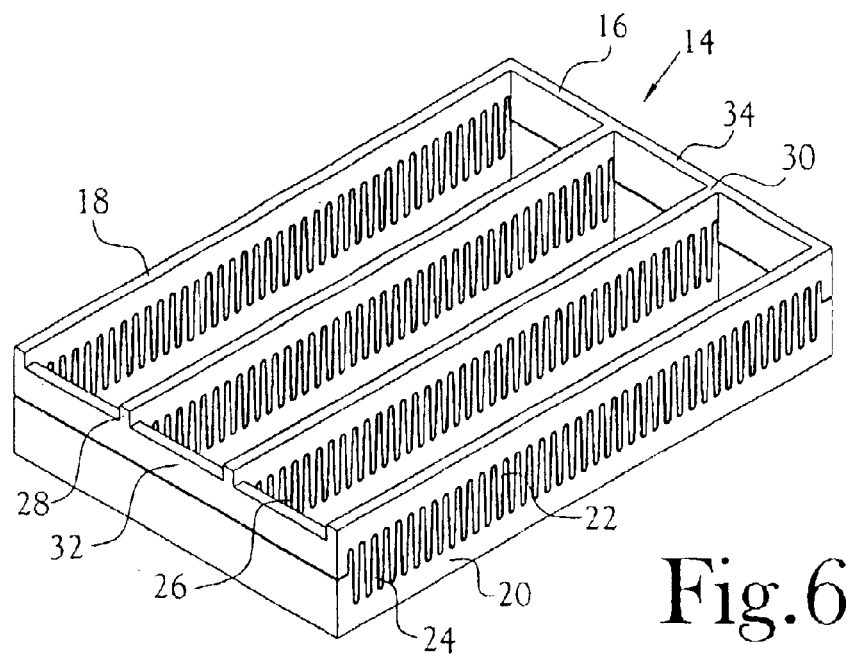
FIG. 6 is a representation of a generally rectangular housing including a plurality of combs which are useful in loading a pleated filter medium into a housing to define a filter unit; and, FIG. 7 is a representation of a cylindrical filter medium embodying various of the features of the present invention.

Referring to FIG. 5, in one embodiment, a pleated filter medium of the present invention may be incorporated into a housing to define a filter unit 14. Incorporation of a pleated filter medium of the present invention into a filter unit 14 is depicted in FIGS. 5 and 6. Specifically, in the depicted embodiment of FIGS. 5 and 6, the fired ceramic-based filter medium is disposed in a frame 16 comprising a plurality of top comb members 18, 18', 18" and 18'", and a like plurality of bottom comb members 20 (typical), the teeth 22 of the top combs meshing with the teeth 24 of the bottom combs and with the pleats 26 of the filter medium interposed between the meshing teeth of the combs. In the depicted embodiment, the opposite ends 28 and 30 (typical) of the combs are secured to respective end walls 32 and 34. Further, the upper margins 36 (typical) of each comb extends beyond the upper surface of the pleats to define flow channels for the distribution of gas flow over the exposed surfaces of the plurality of pleats. In alternative embodiments, the unfired pleated filter may be incorporated into (as by injection molding or by casting) a housing and this combination of housing and pleated filter is thereafter fired.

In one embodiment of the present invention, ceramic fibers, such as the fibers described in U.S. Pat. No. 5,087, 272, or U.S. Pat. No. 4,873,069, or aluminum oxide fibers from Saffil of Berwyn, Pa., or alumino silicate fibers from Thermal Ceramics of Augusta, Ga., or combinations thereof, are suitable for inclusion in a filter medium of the present invention. The choice of cellulosic fibers mixed with the ceramic fibers is not critical, but papermaking fibers are preferred. In one example, between about 10% to about 40%, by weight, of cellulosic fibers may be employed in a suitable mixture. The presence of these cellulosic fibers have been found useful contributors to the flexibility of the web in that they remain in the web through the web pleating process. Firing of the web subsequent to pleating thereof drives off the cellulosic fibers.

One suitable binder assist agent for use in the present invention is a silica solution formed from distilled or deionized H2O and 12.5% Ludox AS-40 Silica solution. This solution is applied to the ceramic fiber web until saturation is reached and thereafter allowed to dry completely. The web is slightly stiffened by this pretreatment.

Following drying of the pretreated web, there is applied to the pretreated web an inorganic ceramic sol. One suitable sol of a desired volume is prepared by scaling up from a concentration of 750 ml of distilled or deionized H2O, 25 grams of Degussa Vista Dispersal Sol-P2, and 10 grams of Degussa Aluminum Oxide C. The pH of solution is adjusted to 3.5 using nitric acid and blended approximately 5–10 minutes. This sol is divided into selected portions whose sum equals to total desired quantity of binder to be applied to the web. In one example, for application to a web of between about 10 and about 30 gm/ft$^2$, the sol solution described hereinabove was diluted to 0.033 gm/ml and used in a first application of the sol to the web, the sol being applied in sufficient volume to saturate the web. Thereafter a sol diluted to 0.067 gm/ml was applied during a second application of the sol, and again in a third application of the sol to the web. As noted each application of sol was applied until saturation was reached and thereafter the ceramic binder-bearing web was dried. In a preferred embodiment, the quantity of ceramic sol deposited on the dried web is between about 30% and 80% of the sum of the weight of the web and ceramic binder on the web.

Firing of a sol impregnated web was carried out at between about 500° and about 1000° C. for a time sufficient to stabilize the inorganic binder and to volatilize organics in the web (e.g., cellulosic fibers).

As desired, alternatively, sols of aluminum oxide, zirconium oxide, silicon dioxide, silicon carbide, aluminum nitride, silicon nitride, mullite, cordierite or combinations thereof may be employed in formulating the ceramic binder sol.

What is claimed:

1. A method for the manufacture of a filter medium comprising the steps of depositing a slurry of a plurality of ceramic fibers in a liquid medium onto a porous carrier to define a web of intertangled ceramic fibers on said carrier, extracting liquid medium from said web, applying to said web a ceramic binder assist, drying said web following the application of ceramic binder assist thereto, thereafter, substantially saturating said web of ceramic fibers with a first quantity of a ceramic binder, drying said web bearing said first quantity of ceramic binder, softening said dried web and pleating said softened web, heat treating said pleated web, thereafter, substantially saturating said web with a second quantity of ceramic binder, drying said web bearing said first and second quantities of ceramic binder, heat treating said dried web bearing said first and second quantities of ceramic binder.

2. The method of claim 1 and including the step of substantially saturating said web bearing said first and second quantities of ceramic binder with at least a third quantity of ceramic binder, followed by drying and heat treating of said web bearing said first, second and third quantities of ceramic binder.

3. The method of claim 1 wherein said step of heat treating said web includes heating of the ceramic binder-bearing web to a temperature sufficient to solidify said binder on said web and wherein during the course of applying said binder, drying said binder-bearing web and heat treating said binder-bearing web, said binder shrinks and draws at least unbonded portions of said fibers between their respective bonded intersections with neighboring fibers.

4. The method of claim 1 wherein the total quantity of ceramic binder applied to said web is between about 30% and about 80%, by weight, of the sum of the weights of the web and the binder.

5. The method of claim 1 where said ceramic binder is a sol at the time of its application to said web.

6. The method of claim 5 wherein said sol comprises aluminum oxide, zirconium oxide, silicon dioxide, silicon carbide, aluminum nitride, silicon nitride, cordierite, mullite or a combination thereof.

7. The method of claim 1 wherein said first quantity of ceramic binder comprises about one-fifth, the second quantity of ceramic binder comprises about two-fifths, and the third quantity of ceramic binder comprises about two-fifths, by weight, of the total weight of ceramic binder applied to said web.

8. The method of claim 1 and including the step of pleating said web bearing said first quantity of ceramic binder, following the drying thereof.

9. The method of claim 8 and including the step of softening said ceramic binder on said web prior to the pleating thereof.

10. The method of claim 9 wherein said web is misted with a quantity of water prior to said pleating step.

11. The method of claim 10 wherein the quantity of water applied to said web is between about 13 and about 23 ml/sq inch of surface area of one surface of said web.

12. The method of claim 1 and including the step of mixing a quantity of cellulosic fibers with said ceramic fibers prior to the formation of said fibers into a web.

13. The method of claim 12 said quantity of cellulosic fibers is between about 10% and 40%, by weight, of said ceramic fibers.

14. The method of claim 12 wherein said heat treating of said web volatilizes said cellullosic fibers.

15. The method of claim 8 and including the step of incorporating said pleated filter medium into a structural member to define a filter unit.

* * * * *